United States Patent [19]
Sobajima et al.

[11] Patent Number: 6,034,177
[45] Date of Patent: Mar. 7, 2000

[54] PROPYLENE RESIN COMPOSITION

[75] Inventors: Yoshihiro Sobajima; Yuu Hayakawa, both of Yokkaichi, Japan

[73] Assignee: Japan Polychem Corporation, Tokyo-To, Japan

[21] Appl. No.: 09/008,563

[22] Filed: Jan. 16, 1998

[30] Foreign Application Priority Data

Jan. 17, 1997 [JP] Japan .................................... 9-006946

[51] Int. Cl.$^7$ .................................................... C08L 23/14
[52] U.S. Cl. ............................................................ 525/88
[58] Field of Search ............................... 525/88, 95, 420

[56] References Cited

U.S. PATENT DOCUMENTS

| | | | |
|---|---|---|---|
| 4,621,114 | 11/1986 | Watanabe | 524/451 |
| 5,532,309 | 7/1996 | Fukui et al. | 524/451 |
| 5,624,991 | 4/1997 | Harada et al. | 524/451 |
| 5,777,020 | 7/1998 | Nagai et al. | 524/451 |
| 5,829,804 | 11/1998 | Sacki et al. | 293/120 |
| 5,889,099 | 3/1999 | Nagi et al. | 524/451 |
| 5,889,100 | 3/1999 | Saki et al. | 524/451 |

FOREIGN PATENT DOCUMENTS

| | | |
|---|---|---|
| 0 509 662 | 10/1992 | European Pat. Off. . |
| 0 593 221 | 4/1994 | European Pat. Off. . |
| 0 605 180 | 7/1994 | European Pat. Off. . |
| 2 312 426 | 10/1997 | United Kingdom . |

*Primary Examiner*—Jeffrey C. Mullis
*Attorney, Agent, or Firm*—Oblon, Spivak, McClelland, Maier & Neustadt, P.C.

[57] ABSTRACT

There is provided a propylene resin composition consisting essentially of the following components (a) and (b):

component (a): 100 parts by weight of a propylene-ethylene block copolymer composed of 60 to 80% by weight of crystalline polypropylene homopolymer moiety (unit A moiety), and 20 to 40% by weight of ethylene-propylene random copolymer moiety (unit B moiety) having an ethylene content of 30 to 60% by weight and a weight-average molecular weight (Mw) of 200,000 to 400,000, the melt flow rate of the component (a) being from 25 to 100g/10 min; and component (b): 1 to 60 parts by weight of an ethylene-α-olefin copolymer rubber containing 20 to 50% by weight of an α-olefin having 3 to 16 carbon atoms.

6 Claims, No Drawings

PROPYLENE RESIN COMPOSITION

BACKGROUND OF THE INVENTION

1. Field of the Invention

The present invention relates to a propylene resin composition having excellent paintability (resistance of paint to warm water), improved injection molding properties (fluidity and the appearance of molded products) and well-balanced physical properties (rigidity and low-temperature impact strength), suitable as a material for a variety of industrial parts such as automotive parts.

2. Background Art

Reinforced propylene resin compositions compounded with talc and rubber components are excellent in molding properties, paintability and mechanical strength. Owing to these advantageous properties, they have conventionally been used as molding materials for producing a variety of industrial parts such as automotive parts, for example, bumpers, instrument panels, fan shrouds, glove boxes and garnishes, and the parts of household appliances such as television sets, video tape recorders, washing machines and vacuum sweepers.

In recent years, in line with the trend toward high-performance or large-sized automobiles, household appliances and the like, the level of requirements for the molded parts has been raised rapidly; for instance, the thinning of the molded parts has been demanded, and the propylene resin compositions have been required to be molded into complicated shapes.

To meet such requirements at higher levels, various improvements have been made on raw materials, which are polypropylene, rubber components and talc. These improvements include improvements in the properties of ethylene-propylene copolymer rubber, and reduction of particle size of talc.

However, no effective means have been proposed so far to meet requirements severer than ever, for example, to provide a resin composition which shows excellent paintability without a degreasing treatment with trichloro-ethane and has improved injection molding properties (excellent fluidity and the property of being molded into products with good appearance almost free from flow mark, sink mark and gels), and well-balanced physical properties (heat resistance and low-temperature impact strength), even when it does not contain inorganic fillers such as talc.

SUMMARY OF THE INVENTION

An object of the present invention is therefore to provide a propylene resin composition which possesses excellent paintability (resistance of paint to warm water) with no need of a degreasing treatment with trichloro-ethane, improved injection molding properties (excellent fluidity and the property of being molded into products with good appearance almost free from flow mark, sink mark and gels), and well-balanced physical properties (heat resistance and low-temperature impact strength).

It has now been found that the above object can be attained by a propylene resin composition obtained by blending a specific ethylene-α-olefin copolymer rubber with a specific propylene-ethylene block copolymer in a specific ratio.

Thus, the propylene resin composition of the present invention consists essentially of the following components (a) and (b):

component (a): 100 parts by weight of a propylene-ethylene block copolymer composed of 60 to 80% by weight of crystalline polypropylene homopolymer moiety (unit A moiety), and 20 to 40% by weight of ethylene-propylene random copolymer moiety (unit B moiety) having an ethylene content of 30 to 60% by weight and a weight-average molecular weight (Mw) of 200,000 to 400,000, the melt flow rate (MFR) of the component (a) being from 25 to 100g/10 min; and component (b): 1 to 60 parts by weight of an ethylene-α-olefin copolymer rubber containing 20 to 50% by weight of an α-olefin having 3 to 16 carbon atoms.

DETAILED DESCRIPTION OF THE INVENTION

[I] Propylene Resin Composition (1) Components (A) Propylene-Ethylene Block Copolymer [Component (a)]

(a) Constitution

The propylene-ethylene block copolymer, component (a), for use in the propylene resin composition of the present invention is a block copolymer composed of 60 to 80% by weight, preferably 60 to 78% by weight, particularly 62 to 76% by weight of crystalline propylene homopolymer moiety (unit A moiety) obtained by the homopolymerization of propylene, and 20 to 40% by weight, preferably 22 to 40% by weight, particularly 24 to 38% by weight of ethylene-propylene random copolymer moiety (unit B moiety) obtained by the copolymerization of ethylene with propylene, having an ethylene content of 30 to 60% by weight, preferably 33 to 60% by weight, particularly 34 to 55% by weight, and a weight-average molecular weight (Mw) of 200,000 to 400,000, preferably 220,000 to 380,000, particularly 240,000 to 360,000. The MFR of this component (a) is from 25 to 100 g/10 min, preferably from 27 to 100 g/10 min, particularly from 28 to 80 g/10 min.

It is preferable that the density of the above-described unit A moiety is 0.9070 g/cm$^3$ or higher, particularly 0.9080 g/cm$^3$ or higher when thermal rigidity is taken into consideration.

When the percentage of the crystalline propylene homopolymer moiety (unit A moiety) contained in the component (a) is lower than the above-described range, the resuling resin composition is insufficient in rigidity. On the other hand, when this percentage is higher than the above-described range, the resulting resin composition is poor in both impact strength and paintability.

Further, when the ethylene content of the above-described ethylene-propylene random copolymer moiety (unit B moiety) is lower than the above-described range, the resulting resin composition is insufficient in impact strength. On the other hand, when the ethylene content is higher than the above-described range, the resulting resin composition is poor in rigidity.

Furthermore, when the MFR of the component (a) is lower than the above-described range, the resulting resin composition is poor in injection molding properties. On the other hand, when the MFR of the component (a) is higher than the above-described range, the resulting resin composition is insufficient in impact strength.

Measurement

The aforementioned percentage of the unit B moiety in the propylene-ethylene block copolymer can be determined by backward calculation from the weight of a solid phase obtained by immersing 2 g of a sample in 300 g of boiling xylene for 20 minutes for dissolution, cooling this solution to room temperature to separate out a solid phase, and isolating the solid phase by means of filtration using a glass filter, followed by drying.

The above-indicated ethylene content of the unit B moiety can be determined by the infrared spectrum analysis method or the like.

The MFR of the component (a) can be determined in accordance with JIS-K7210 (230° C., 2.16 kg).

The weight-average molecular weight (Mw) of the unit B moiety can be determined by concentrating the dissolved matter passed through the above-mentioned glass filter to dryness, and subjecting the residue to GPC (gel permeation chromatography).

Adjustment of MFR

In order to impart excellent injection molding properties and well-balanced physical properties to the resulting resin composition, it is preferable to adjust the MFR of the propylene-ethylene block copolymer, component (a), to 27 to 100 g/10 min, particularly to 28 to 80 g/10 min.

In general, the MFR of the propylene-ethylene block copolymer can be adjusted by controlling various conditions such as temperature and pressure at the polymerization. It is also possible to treat the polymer with various peroxides after the polymerization is completed, thereby adjusting the MFR of the polymer. However, the former method is preferred.

(b) Production

The propylene-ethylene block copolymer, component (a), may be produced by the slurry, gas phase, or liquid-phase bulk polymerization method, using a highly-stereospecific catalyst. It is preferable to produce the block copolymer by the gas phase polymerization method when the paintability of the resulting resin composition and the production cost are taken into consideration. Further, either a batch process or continuous process can be adopted as a polymerization process. It is however preferable to produce the block copolymer by means of continuous polymerization.

It is preferable to produce the propylene-ethylene block copolymer in the following manner from the viewpoint of quality: propylene is firstly homopolymerized to form the crystalline propylene homopolymer moiety (unit A moiety), and the random copolymerization of propylene with ethylene is then carried out to form the ethylene-propylene random copolymer moiety (unit B moiety).

A specific method for producing the propylene-ethylene block copolymer is as follows: propylene is homopolymerized by using a catalyst which is a combination of a solid component prepared by bringing titanium tetrachloride, an organic acid halide and an organosilicon compound into contact with magnesium chloride, and an organoaluminum compound component, and the random copolymerization of propylene with ethylene is then carried out.

The propylene-ethylene block copolymer may further comprise, in addition to propylene and ethylene, other unsaturated monomers, for example, α-olefins such as 1-butene and vinyl esters such as vinyl acetate in such an amount that does not significantly impair the advantages of the present invention.

(B) Ethylene-Α-Olefin Copolymer Rubber [Component (b)]

(a) Constitution

The ethylene-α-olefin copolymer rubber, component (b), constituting the propylene resin composition of the present invention comprises 20 to 50% by weight, preferably 20 to 45% by weight, particularly 20 to 40% by weight of an α-olefin.

Specific examples of α-olefins useful for forming the component (b) include propylene, 1-butene, 1-pentene, 1-hexene, 1-heptene, 1-octene, 1-nonene, 1-decene, 1-undecene and 1-dodecene.

Of these, propylene, 1-butene, 1-pentene, 1-hexene, 1-heptene and 1-octene are preferred, and 1-butene, 1-hexene and 1-octene are particularly preferred.

When the α-olefin content of the component (b) is lower than the above-described range, the resulting resin composition of the present invention is poor in both paintability and impact strength. On the other hand, when the α-olefin content is made higher than the above-described range, not only the rigidity of the resin composition is lowered, but also it becomes difficult to keep the copolymer rubber in a pelletized state. The handling properties of the copolymer rubber upon the production of the resin composition of the present invention are thus drastically impaired.

The MFR (230° C., 2.16 kg) of the ethylene-α-olefin copolymer rubber is preferably 0.5 to 100 g/10 min, particularly 4 to 100 g/10 min. Further, the density of the copolymer rubber is preferably 0.85 to 0.89 g/cm$^3$, particularly 0.85 to 0.88 g/cm$^3$.

When the MFR of the copolymer rubber is lower than the above-described range, the resulting resin composition tends to have impaired injection molding properties and paintability. On the other hand, when the MFR of the copolymer rubber is higher than the above-described range, the resulting resin composition tends to have lowered impact strength.

Further, when the density of the copolymer rubber is lower than the above-described range, the pelletization of the copolymer rubber itself tends to become difficult. On the other hand, when the density of the copolymer rubber is higher than the above-described range, the paintability and impact strength of the resin composition tend to be impaired.

The following ethylene-α-olefin copolymer rubbers are most preferred: ethylene-1-butene copolymer rubber having a 1-butene content of 25 to 40% by weight, an MFR (230° C., 2.16 kg) of 4 to 100 g/10 min, and a density of 0.85 to 0.88 g/cm$^3$; and ethylene-1-octene copolymer rubber having a 1-octene content of 20 to 40% by weight, an MFR (230° C., 2.16 kg) of 4 to 100 g/10 min, and a density of 0.85 to 0.88 g/cm$^3$.

These copolymer rubbers impart further improved injection molding properties, paintability and physical-property balance (low-temperature impact strength and regidity) to the resin composition of the present invention.

Further, it is preferable that these copolymer rubbers be produced by using vanadium compounds or metallocene catalysts as described in WO 91/04257.

Measurement

The above α-olefin content of the component (b) can be determined by a conventional method such as the infrared spectrum analysis method or $^{13}$C-NMR method (in general, the value obtained by the infrared spectrum analysis method tends to be smaller (by approximately 10 to 50%) than the value obtained by the $^{13}$C-NMR method when the density of the component (b) is lower).

The above MFR of the component (b) can be determined in accordance with JIS-K7210 (230° C., 2.16 kg).

Further, the density of the component (b) can be determined in accordance with JIS-K7112.

(b) Production

Polymerization Method

The above-described ethylene-α-olefin copolymer rubber may be produced by the gas-phase fluidized-bed, solution, slurry or high-pressure polymerization method.

When the polymerization is carried out, a small amount of a diene component such as dicyclopentadiene or ethylidene norbornene may also be copolymerized.

Polymerization Catalyst

Examples of catalysts that can be used for the polymerization include titanium compounds such as titanium halides, vanadium compounds, organoaluminum-magnesium complexes such as alkyl aluminum-magnesium complexes and alkylalkoxy aluminum-magnesium complexes, the so-called Ziegler catalysts combined with organometallic compounds such as alkyl aluminums or alkyl aluminum chlorides, and metallocene catalysts as described in International Patent Publication WO 91/04257.

The catalysts called "metallocene catalysts" may not contain alumoxane. However, preferred are Kaminsky catalysts comprising alumoxane in combination with metallocene compounds.

(C) Other Components (Optional Components [Component (c)])

In addition to the aforementioned essential components (a) and (b), the following additives or compounding ingredients can optionally be incorporated into the propylene resin composition of the present invention so long as they do not remarkably mar the effects of the present invention, or in order to further improve the properties of the propylene resin composition.

Specific examples of optional components that can be used in the present invention include various fillers such as talc and mica, pigments to be used for coloring, antioxidants, antistatic agents, flame-retardants, photostabilizers, various nucleating agents such as organoaluminum and talc, various resins other than the above-described components (a) and (b), and various rubbers such as styrene-ethylene-butylene-styrene copolymer rubber.

In particular, the incorporation of fillers such as talc, various nucleating agents, or various rubbers is effective for improving the balance between rigidity and impact strength, and the dimensional stability, and the incorporation of hindered amine stabilizers is effective for improving the weather resistance and durability.

(2) Blend Ratio

The ethylene-α-olefin copolymer rubber, component (b), is incorporated into the propylene resin composition of the present invention in an amount of 1 to 60 parts by weight, preferably 2 to 30 parts by weight, particularly 3 to 15 parts by weight for 100 parts by weight of the propylene-ethylene block copolymer, component (a).

When the component (b) is used in an amount less than the above-described range, the resulting propylene resin composition is poor in impact strength and paintability. On the other hand, when the component (b) is used in an amount more than the above-described range, the resulting propylene resin composition is poor in rigidity and in injection molding properties, especially in the appearance of molded products.

(3) Preparation of Propylene Resin Composition

The propylene resin composition of the present invention can be prepared by blending and kneading the aforementioned components (a) and (b) and the optional component (c) using a conventional kneading machine such as a single-screw extruder, twin-screw extruder, Banbury mixer, roll mill, Brabender Plastograph or kneader blender, and preferably granulating the resulting mixture. The use of a twin-screw extruder is generally preferred from the viewpoint of uniform dispersion of the components.

In the kneading/granulation process, the essential components (a) and (b) and the optional component (c) can be kneaded simultaneously. Alternatively, in order to impart further improved properties to the resulting resin composition, it is possible to knead these components in the following stepwise manner: the component (a) is firstly kneaded with a part or the entirety of the component (c), and the resultant mixture is then kneaded with the remaining components.

(4) Physical Properties

The propylene resin composition thus obtained has excellent paintability (resistance of paint to warm water), improved injection molding properties (fluidity and the appearance of molded products), and well-balanced physical properties (high rigidity and low-temperature impact strength). It is particularly preferable that the propylene resin composition have a melt flow rate of 25 g/10 min or higher, a peel strength of paint after warm-water treatment, as described later, of 1,500 g/cm or more, a flexural modulus of 800 MPa or more, and an Izod impact strength at −30° C. of 6 $KJ/m^2$ or more.

(5) Molding of Propylene Resin Composition

The above-described propylene resin composition can be molded into a variety of molded products by various molding methods such as injection molding, injection compression molding (press injection molding), compression molding and extrusion molding (sheet forming, film forming, blow molding). It is however preferable to employ injection molding (including gas injection molding) or injection compression molding (press injection molding).

[II] Use

The propylene resin composition of the present invention possesses excellent paintability (resistance of paint to warm water) with no need of a degreasing treatment with trichloroethane, improved injection molding properties (specifically, excellent fluidity and the property of being molded into products with good appearance almost free from flow mark, sink mark and gels) and well-balanced physical properties (high rigidity and low-temperature impact strength). Accordingly, the propylene resin composition of the invention can advantageously be used as a molding material for producing various industrial parts, in particular, a variety of high-performance, large-sized parts having thin walls, for example, automotive parts such as bumpers, instrument panels, fan shrouds, glove boxes and garnishes, and the parts of household appliances such as television sets, video tape recorders, washing machines and vacuum sweepers.

EXAMPLES

The following examples illustrate the present invention but are not intended to limit it.

[I] Starting Materials

The following materials were herein used as the components (a) and (b).

(1) Component (a): Used were the following block copolymers which had been pelletized and to which an antioxidant had been added.

a-1: Propylene-ethylene block copolymer produced by means of gas phase polymerization, composed of 72% by weight of unit A moiety having a density of 0.9092 $g/cm^3$, and 28% by weight of unit B moiety having an ethylene content of 40% by weight and a weight-average molecular weight (Mw) of 310,000, the MFR of the block copolymer being 32 g/10 min.

a-2: Propylene-ethylene block copolymer produced by means of gas phase polymerization, composed of 61% by weight of unit A moiety having a density of 0.9089 g/cm$^3$, and 39% by weight of unit B moiety having an ethylene content of 38% by weight and a weight-average molecular weight (Mw) of 280,000, the MFR of the block copolymer being 30 g/10 min.

a-3: Propylene-ethylene block copolymer produced by means of gas phase polymerization, composed of 83% by weight of unit A moiety having a density of 0.9081 g/cm$^3$, and 17% by weight of unit B moiety having an ethylene content of 35% by weight and a weight-average molecular weight (Mw) of 270,000, the MFR of the block copolymer being 20 g/10 min.

a-4: Propylene-ethylene block copolymer produced by means of gas phase polymerization, composed of 84% by weight of unit A moiety having a density of 0.9076 g/cm$^3$, and 16% by weight of unit B moiety having an ethylene content of 40% by weight and a weight-average molecular weight (Mw) of 510,000, the MFR of the block copolymer being 20 g/10 min.

a-5: Propylene-ethylene block copolymer produced by means of gas phase polymerization, composed of 90% by weight of unit A moiety having a density of 0.9083 g/cm$^3$, and 10% by weight of unit B moiety having an ethylene content of 36% by weight and a weight-average molecular weight (Mw) of 330,000, the MFR of the block copolymer being 22 g/10 min.

(2) Component (b): The following copolymer rubbers were used after pelletized.

b-1: Ethylene-1-butene copolymer rubber produced by means of solution polymerization using a vanadium compound catalyst, containing 32.6% by weight of 1-butene (determined by an infrared method), having an MFR of 5.8 g/10 min and a density of 0.863 g/cm$^3$.

b-2: Ethylene-1-butene copolymer rubber produced by means of solution polymerization using a vanadium compound catalyst, containing 34.4% by weight of 1-butene (determined by an infrared method), having an MFR of 30.9 g/10 min and a density of 0.863 g/cm$^3$.

b-3: Ethylene-1-octene copolymer rubber produced by means of solution polymerization using a metallocene catalyst, containing 24.4% by weight of 1-octene (determined by an infrared method), having an MFR of 11.3 g/10 min and a density of 0.872 g/cm$^3$.

b-4: Ethylene-1-octene copolymer rubber produced by means of solution polymerization using a metallocene catalyst, containing 24.1% by weight of 1-octene (determined by an infrared method), having an MFR of 59.3 g/10 min and a density of 0.872 g/cm$^3$.

b-5: Ethylene-propylene copolymer rubber produced by means of solution polymerization using a vanadium compound catalyst, containing 22.5by weight of propylene (determined by an infrared method), having an MFR of 8.2 g/10 min and a density of 0.870 g/cm$^3$.

b-6: Ethylene-1-butene copolymer rubber produced by means of solution polymerization using a vanadium compound catalyst, containing 17.1% by weight of 1-butene (determined by an infrared method), having an MFR of 1.2 g/10 min and a density of 0.885 g/cm$^3$.

[II] Evaluation

Evaluation was carried out by the following methods.

<Injection Molding Properties>

(Fluidity: MFR)

As a measure of molding properties, the MFRs of the resin compositions were measured in accordance with JIS-K7210 (230° C., 2.16 kg). Those having MFRs of 20 g/10 min or higher are excellent in fluidity at the time of molding, and those having MFRs of 25 g/10 min or higher are particularly excellent in the same.

(Appearance of Molded Product)

The resin compositions were respectively molded into sheets by using a screw in-line type injection molding machine with a sheet forming metal mold (350 mm×100 mm ×2.5 mm, pear-embossed, pin-point gate). The surfaces of these sheets were visually observed in terms of the presence and degree of flow mark (wave-like flow pattern), sink mark (fine depression formed on the surface), and gels (fine spot), and the appearance of the sheets was evaluated according to the standards below.

It is noted that the molding conditions were as follows: the molding temperature was 210° C.; the injection pressure was 600 kg/cm$^2$; and the mold was cooled to 40° C.

Standards for Evaluation:

⊚: Flow mark, sink mark or gels is not found at all, or found only slightly; very suitable for practical use.

○: Flow mark, sink mark or gels is found only on a part of the surface; acceptable for practical use.

Δ: Flow mark, sink mark or gels is found only on a part of the surface, but it is remarkable; undesirable for practical use.

X: Flow mark, sink mark and/or gels are/is remarkably found on a large part of the surface; impossible to use practically.

<Paintability>

(Painting)

A primer was firstly coated, by using an air spray gun, onto the surface of a flat plate which had been obtained by molding of the resin composition and to which no surface treatment had been conducted, so that the thickness of the primer layer would be approximately 20 μm, followed by baking. A two-pack urethane was then applied to the primer layer formed on the flat plate so that the thickness of the urethane paint layer would be approximately 15 μm.

(Baking)

The painted flat plate was dried by baking at 105° C. for 30 minutes, and then allowed to stand at room temperature for 48 hours.

(Treatment with Warm Water)

The above flat plate was dipped in warm water at 40° C. for 240 hours, and then allowed to stand at room temperature for 48 hours.

(Peel Strength Test)

On the surface of the painted flat pate after treated with warm water, straight-line notches were provided with the space of 10 mm by using a single-edged blade. A strip of the paint layer was peeled by a tensile strength tester at a peel rate of 10 mm/min and a peel angle of 180 degrees, and the load in peeling (peel strength) was read.

A greater value of peel strength indicates superiority of the resin composition for practical use. The peel strength of 1,500 g/cm or more is especially preferred.

<Physical Properties>

(Rigidity: Flexural Modulus)

Flexural modulus was measured in accordance with JIS-K7203 at a temperature of 23° C. A value of 800 MPa or higher is particularly preferred.

(Impact Strength: Izod Impact Strength)

Izod impact strength was measured in accordance with JIS-K7110 at a temperature of −30° C. A value of 6 kJ/m² or higher is particularly preferred.

[III] Examples

Examples 1 to 7 & Comparative Examples 1 to 5

The components (a) and (b) in the amounts shown in Table 1 were thoroughly mixed in a tumbling mixer.

Thereafter, the mixture was kneaded and granulated using a high-speed twin-screw extruder, model "KCM", manufactured by Kobe Steel, Ltd., Japan. The pellets obtained were fed to an injection molding machine, and evaluated in terms of injection molding properties. The pellets were molded into specimens to be used for evaluating physical properties, and also into sheet specimens to be used for evaluating paintability, and these properties were evaluated by the above-described methods. The results are shown in Table 1.

product showed excellent paintability and well-balanced physical properties enough for practical use as an automotive bumper.

What is claimed is:

1. A propylene resin composition consisting essentially of the following components (a) and (b):

component (a): 100 parts by weight of a propylene-ethylene block copolymer composed of 62 to 76% by weight of crystalline polypropylene homopolymer moiety (unit A moiety), and 24 to 38% by weight of ethylene-propylene random copolymer moiety (unit B moiety) having an ethylene content of 30 to 60% by weight and a weight-average molecular weight (Mw) of 200,000 to 400,000, the melt flow rate of the component (a) being from 25 to 100 g/10 min, wherein the melt flow rate is measured at 230° C. under a load of 2.16 kg; and component (b): 1 to 60 parts by weight of an ethylene-α-olefin copolymer rubber containing 20 to 50% by weight of an α-olefin having 3 to 16 carbon atoms, and wherein the composition does not contain talc.

TABLE 1

|  | Propylene resin composition | | | | Evaluation | | | |
|  | Component (a) | | Component (b) | | Injection molding properties | Paintability (resistance to warm water) | Physical properties | |
|  | Propylene-ethylene block copolymer | | Ethylene-α-olefin copolymer rubber | | MFR | Appearance of molded | Peel strength | Flexural modules | Izod impact strength at −30° C. |
|  | Type | parts by weight | Type | parts by weight | (g/10 min) | product | (g/cm) | (MPa) | (KJ/m²) |
| Example | | | | | | | | | |
| 1 | a-1 | 100 | b-1 | 8 | 25 | ⊙ | 2,060 | 1,030 | 8.3 |
| 2 | a-1 | 100 | b-2 | 8 | 28 | ⊙ | 2,220 | 1,100 | 8.0 |
| 3 | a-1 | 100 | b-3 | 8 | 27 | ⊙ | 1,970 | 1,180 | 7.7 |
| 4 | a-1 | 100 | b-3 | 11 | 28 | ○ | 2,370 | 1,010 | 8.3 |
| 5 | a-1 | 100 | b-4 | 8 | 31 | ⊙ | 2,010 | 1,040 | 7.2 |
| 6 | a-2 | 100 | b-2 | 5 | 26 | ⊙ | 1,540 | 980 | 7.5 |
| 7 | a-2 | 100 | b-5 | 11 | 22 | ○ | 1,400 | 720 | 6.0 |
| Comp. Example | | | | | | | | | |
| 1 | a-3 | 100 | b-3 | 8 | 16 | Δ | 1,780 | 1,010 | 4.6 |
| 2 | a-3 | 100 | b-3 | 25 | 13 | Δ | 2,470 | 740 | 5.7 |
| 3 | a-4 | 100 | b-3 | 8 | 14 | X* | 890 | 1,200 | 8.1 |
| 4 | a-5 | 100 | b-3 | 8 | 16 | ○ | 780 | 1,310 | 3.7 |
| 5 | a-1 | 100 | b-6 | 8 | 18 | Δ | 1,100 | 990 | 4.1 |

*: numerous gels were observed

As shown in Table 1, all of the propylene resin compositions of Examples 1 to 7 showed excellent injection molding properties, excellent paintability (high resistance to warm water), and well-balanced physical properties.

On the other hand, these properties of the propylene resin compositions of Comparative Examples 1 to 5 were found to be ill-balanced.

Example 8

The resin composition of Example 2 was molded into a bumper for small automobiles, having a width in the longer direction of 1,370 mm, a width of the side face of 330 mm, a height of 295 mm, and a wall thickness of 3.3 mm by using a screw in-line type injection molding machine, model "J4000EV", manufactured by The Japan Steel Works, Ltd., Japan at a molding temperature of 210° C. under an injection pressure of 600 kg/cm².

The fluidity of the composition and the appearance of the molded product were found to be good, and the molded 2. The propylene resin composition according to claim 1, comprising 3 to 15 parts by weight of the component (b).

3. The propylene resin composition according to claim 1, wherein the component (b) has a melt flow rate of 4 to 100 g/10 min, wherein the melt flow rate is measured at 230° C. under a load of 2.16 kg.

4. The propylene resin composition according to claim 1, wherein the component (b) is ethylene-1-butene copolymer rubber or ethylene-1-octene copolymer rubber.

5. The propylene resin composition according to claim 1, having a melt flow rate of 25 g/10 min or higher, a peel strength of paint after warm-water treatment of 1,500 g/cm or higher, a flexural modulus of 800 MPa or more, and an Izod impact strength at −30° C. of 6 KJ/m² or more.

6. An automotive bumper obtained by subjecting a propylene resin composition consisting essentially of the following components (a) and (b):

component (a): 100 parts by weight of a propylene-ethylene block copolymer composed of 60 to 80% by weight of crystalline polypropylene homopolymer moiety (unit A moiety), and 20 to 40% by weight of ethylene-propylene random copolymer moiety (unit B moiety) having an ethylene content of 30 to 60% by weight and a weight-average molecular weight (Mw) of 200,000 to 400,000, the melt flow rate of the component (a) being from 25 to 100 g/10 min, wherein the melt flow rate is measured at 230° C. under a load of 2.16 kg; and component (b): 1 to 60 parts by weight of an ethylene-α-olefin copolymer rubber containing 20 to 50% by weight of an α-olefin having 3 to 16 carbon atoms, and wherein the composition does not contain talc, to injection molding or injection compression molding.

* * * * *